(12) United States Patent
Park et al.

(10) Patent No.: US 7,588,699 B2
(45) Date of Patent: Sep. 15, 2009

(54) ELECTRICALLY CONDUCTIVE, OPTICALLY TRANSPARENT POLYMER/CARBON NANOTUBE COMPOSITES AND PROCESS FOR PREPARATION THEREOF

(75) Inventors: Cheol Park, Yorktown, VA (US); Kent A. Watson, New Kent, VA (US); Zoubeida Ounaies, Norfolk, VA (US); John W. Connell, Yorktown, VA (US); Joseph G. Smith, Smithfield, VA (US); Joycelyn S. Harrison, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 243 days.

(21) Appl. No.: 10/288,797

(22) Filed: Nov. 1, 2002

(65) Prior Publication Data

US 2003/0158323 A1 Aug. 21, 2003

Related U.S. Application Data

(60) Provisional application No. 60/336,109, filed on Nov. 2, 2001.

(51) Int. Cl.
*H01B 1/24* (2006.01)
*C01B 31/00* (2006.01)
*B32B 9/00* (2006.01)

(52) U.S. Cl. .................. 252/502; 252/500; 252/511; 423/445 B; 423/447.3; 528/335; 528/337; 524/495; 524/496

(58) Field of Classification Search ............... 252/502, 252/511; 423/445 B; 427/457, 487; 428/922, 428/924; 528/335, 337; 524/151; 526/328.5, 526/329.7; 977/742, 753, 778, 785
See application file for complete search history.

(56) References Cited

U.S. PATENT DOCUMENTS 4,810,734 A 3/1989 Kawasumi et al.

(Continued)

FOREIGN PATENT DOCUMENTS

CN 1329111 A 1/2002

(Continued)

OTHER PUBLICATIONS

Gong et al, "Surfactant Assisted Processing of Carbon Nanotube/Polymer Composites," Chem. Mater. 2000, 12, pp. 1049-1052.*

(Continued)

*Primary Examiner*—Stanley Silverman
*Assistant Examiner*—Kallambella Vijayakumar
(74) *Attorney, Agent, or Firm*—Robin W. Edwards

(57) ABSTRACT

The present invention is directed to the effective dispersion of carbon nanotubes (CNTs) into polymer matrices. The nanocomposites are prepared using polymer matrices and exhibit a unique combination of properties, most notably, high retention of optical transparency in the visible range (i.e., 400-800 nm), electrical conductivity, and high thermal stability. By appropriate selection of the matrix resin, additional properties such as vacuum ultraviolet radiation resistance, atomic oxygen resistance, high glass transition ($T_g$) temperatures, and excellent toughness can be attained. The resulting nanocomposites can be used to fabricate or formulate a variety of articles such as coatings on a variety of substrates, films, foams, fibers, threads, adhesives and fiber coated prepreg. The properties of the nanocomposites can be adjusted by selection of the polymer matrix and CNT to fabricate articles that possess high optical transparency and antistatic behavior.

5 Claims, 10 Drawing Sheets

U.S. PATENT DOCUMENTS

| | | | |
|---|---|---|---|
| 5,357,040 | A | 10/1994 | McGrath et al. |
| 5,466,431 | A | 11/1995 | Dorfman et al. |
| 5,470,910 | A | 11/1995 | Spanhel et al. |
| 5,554,670 | A | 9/1996 | Giannelis et al. |
| 5,591,382 | A | 1/1997 | Nahass et al. |
| 5,611,964 | A | 3/1997 | Friend et al. |
| 5,638,251 | A | 6/1997 | Goel et al. |
| 5,643,502 | A | 7/1997 | Nahass et al. |
| 5,643,990 | A * | 7/1997 | Uehara et al. ............... 524/496 |
| 5,658,653 | A | 8/1997 | Bosnyak et al. |
| 5,686,585 | A * | 11/1997 | Hishiro et al. ............... 534/872 |
| 5,786,068 | A | 7/1998 | Dorfman et al. |
| 5,788,738 | A | 8/1998 | Pirzada et al. |
| 5,840,796 | A | 11/1998 | Badesha et al. |
| 5,851,507 | A | 12/1998 | Pirzada et al. |
| 5,853,877 | A * | 12/1998 | Shibuta ..................... 428/357 |
| 5,868,966 | A | 2/1999 | Wei et al. |
| 5,876,812 | A | 3/1999 | Frisk et al. |
| 5,877,248 | A | 3/1999 | Beall et al. |
| 5,905,000 | A | 5/1999 | Yadav et al. |
| 5,908,585 | A | 6/1999 | Shibuta et al. |
| 5,952,040 | A | 9/1999 | Yadav et al. |
| 5,972,448 | A | 10/1999 | Frisk et al. |
| 6,038,060 | A | 3/2000 | Crowley |
| 6,057,035 | A | 5/2000 | Singh et al. |
| 6,066,269 | A | 5/2000 | Wei et al. |
| 6,136,909 | A | 10/2000 | Liao et al. |
| 6,156,835 | A | 12/2000 | Anderson et al. |
| 6,228,904 | B1 | 5/2001 | Yadav et al. |
| 6,252,020 | B1 | 6/2001 | Kuo et al. |
| 6,265,466 | B1 | 7/2001 | Glatkowski et al. |
| 6,287,992 | B1 | 9/2001 | Polansky et al. |
| 6,323,270 | B1 | 11/2001 | Ishida |
| 6,348,295 | B1 | 2/2002 | Griffith et al. |
| 6,361,861 | B2 | 3/2002 | Gao et al. |
| 6,368,569 | B1 | 4/2002 | Haddon et al. |
| 6,372,837 | B1 | 4/2002 | Fischer et al. |
| 6,403,231 | B1 | 6/2002 | Mueller et al. |
| 6,410,142 | B1 | 6/2002 | Chen et al. |
| 6,419,717 | B2 | 7/2002 | Moy et al. |
| 6,426,134 | B1 * | 7/2002 | Lavin et al. ............... 428/300.1 |
| 6,599,961 | B1 * | 7/2003 | Pienkowski et al. ......... 523/120 |
| 7,060,241 | B2 | 6/2006 | Glatkowski |
| 2002/0001620 | A1 * | 1/2002 | Pienkowski et al. ......... 424/486 |
| 2002/0048632 | A1 * | 4/2002 | Smalley et al. ............. 427/230 |
| 2002/0068170 | A1 | 6/2002 | Smalley et al. |
| 2002/0161101 | A1 * | 10/2002 | Carroll et al. ............... 524/495 |
| 2002/0197474 | A1 * | 12/2002 | Reynolds ................... 428/398 |
| 2003/0089893 | A1 * | 5/2003 | Niu et al. ................... 252/500 |

FOREIGN PATENT DOCUMENTS

| | | |
|---|---|---|
| EP | 1 054 036 A1 | 11/2000 |
| JP | 2000-026760 | 1/2000 |
| JP | 2001-011344 | 1/2001 |
| JP | 2003-003047 | 1/2003 |

OTHER PUBLICATIONS

Sandler et al, "Development of a Dispersion Process for Carbon nanotubes in an Epoxy matrix and the resulting Electrical Properties," Polymer, 1999, pp. 5967-5971.*

Fan et al ,"Synthesis, Characterizations and Physical Properties of Carbon Nanotubes Coated by Conducting Polypyrrole," J. Apl. Poly. Sci., 1999, V74, pp. 2605-2610.*

Jia et al, "Study on Poly(methyl methacrylate)/carbon nanotube composites," Matl. Sci. Eng. 1999 A271, pp. 3 95-400.*

Yong K. Kim, A.F. Lewis, S.B. Warner, P.K. Patra, & P. Calvert, "Nanocomposite Fibers," National Textile Center Annual Report, p. 1-10.

Q.H. Wang, T.D. Corrigan, J.Y. Dal, R.P.H. Chang, & A.R. Krauss, "Field Emission from Nanotube Bundle Emitters at Low Fields," Appl. Phys. Lett, American Institute of Physics, vol. 70 (No. 24), p. 3308-3310, (Jun. 16, 1997).

E.T. Mickelson, I.W. Chiang, J.L. Zimmerman, P.J. Boul, J. Lozano, J. Liu, R.E. Smalley, R.H. Hauge, & J.L. Margrave, "Solvation of Fluorinated Single-Wall Carbon Nanotubes in Alcohol Solvents," J. Phys. Chem, American Chemical Society, p. 4318-4322, (May 3, 1999).

Xiaoyi Gong, Jun Liu, Suresh Baskaran, Roger D. Voise, & James S. Young, "Surfactant-Assisted Processing of Carbon Nanotube/Polymer Composites," Chem Master, 2nd ed., American Chemical Society, p. 1049-1052, (Mar. 17, 2000).

J. N. Coleman, S. Curran, A.B. Dalton, A.P. Davey, B. McCarthy, W. Blau, & R.C. Barklie, "Percolation-Dominated Conductivity in a Conjugated-Polymer-Carbon-Nanotube Composite," Rapid Communications, The American Physical Society, p. 7492-7495, (May 19, 1998).

A.B. Kaiser, G. Dusberg, & S. Roth, "Heterogeneous Model for Conduction in Carbon Nanotubes," Physical Review, The American Physical Society, p. 1418-1421, (Aug. 22, 1997).

Seamus A. Curran, Pulicket M. Ajayan, Werner J. Blau, David L. Carroll, Johnathan N. Coleman, Alan B. Dalton, Andrew P. Davey, Anna Drury, Brendan McCarthy, Stephanie Maier, & Adam Stevens, "A Composite from Poly(m-phenylenevinylene-co-2,5-dioctoxy-p-phenylenevinylene) and Carbon Nanotubes: A Novel Material for Molecular Optoelectronics," Advanced Materials, Weinheim, p. 1091-1093, (Oct. 31, 1998).

Milo S.P. Shaffer & Alan H. Windle, "Fabrication and Characterization of Carbon Nanotube/Poly(vinyl alcohol) Composites," Advanced Materials, Weinheim, p. 937-941, (Oct. 31, 1999).

J. Sandler, M.S.P. Shaffer, T. Prasse, W. Bauhofer, K. Schulte, & A.H. Windle, "Development of a Dispersion Process for Carbon Nanotubes in an Epoxy Matrix and the Resulting Electrical Properties," Polymer Communication, Elsevier Science Ltd., p. 5967-5971, (Oct. 31, 1999).

R. Haggenmueller, H.H. Gommans, A.G. Rinzler, J.E. Fischer, & K.I. Winey, "Aligned Single-Wall Carbon Nanotubes in Composites by Melt Processing Methods," Chemical Physics Letters, Elsevier Science, p. 219-225, (Oct. 31, 2000).

Zhijie Jia, Zhengyuan Wang, Cailu Xu, Ji Liang, BingQing Wei, Dehai Wu, Shaowen Zhu, "Study on Poly(methyl methacrylate)/Carbon Nanotube Composites," Materials Science & Engineering, Elsevier Sciences, p. 395-400, (Oct. 31, 1999).

Junhua Fan, Meixang Wan, Daoben Zhu, Baohe Chang, Zhenwei Pan, & Sishen Xie, "Synthesis, Characterizations, and Physical Properties of Carbon Nanotubes Coated by Conducted Polypyrrole," Journal of Applied Polymer Sciences, John Wiley & Sons, Inc., p.

Cheol Park, Zoubeida Ounaies, Kent A. Watson, Kristin Pawlowski, Sharon E. Lowther, John W. Connell, Emilie J. Siochi, Joycelyn S. Harrison, & Terry L. St. Clair, "Polymer-Single Wall Carbon Nanotube Composites for Potential Spacecraft Applications,".

Peter T. Lillehei, Cheol Park, Jason H. Rouse, & Emilie J. Siochi, "Imaging Carbon Nanotubes in High Performance Polymer Composites via Magnetic Force Microscopy," Nano Letters, American Chemical Society, vol. 2 (No. 8), p. 827-829, (Apr. 17, 2002).

Cheol Park, Zoubeida Ounaies, Kent A. Watson, Roy E. Crooks, Joseph Smith, Jr., Sharon E. Lowther, John W. Connell, Emilie J. Siochi, Joycelyn S. Harrison & Terry L. St. Clair, "Dispersion of Single Wall Carbon Nanotubes by in Situ Polymerization Under Sonication," Chemical Physics Letters, Elsevier, p. 303-308, (Oct. 4, 2002).

Sumio Lijima, "Helical Microtubules of Graphitic Carbon," Letters to Nature, Nature, p. 56-58, (Nov. 7, 1991).

P.M. Ajayan, "Nanotubes from Carbon," Chem Rev., American Chemical Society, p. 1787-1799, (Jun. 29, 1998).

Andreas Thess, Roland Lee, Pavel Nikolaev, Hongjie Dai, Pierre Petit, Jerome Robert, Chunhui Xu, Young Hee Lee, Seong Gon Kim, Andrew G. Rinzler, Daniel T. Colbert, Gustavo Scuseria, David Tomanek, John E. Fischer, & Richard E. Smalley, "Crystalline Ropes of Metallic Carbon Nanotubes," Science, Science, p. 483-487, (Jul. 26, 1996).

Stanislaus S. Wong, James D. Harper, Peter T. Lansbury, & Charles M. Lieber, "Carbon Nanotube Tips: High-Resolution Probes for Imaging Biological Systems," J. Am. Chem. Soc., American Chemical Society, p. 603-604, (Nov. 3, 1997).

Sanders J. Tans, Alwin R.M. Verschueren & Cees Dekker, "Room-Temperature Transistor Based on a Single Carbon Nanotube," Letters to Nature.

U.S. Appl. No. RD 405064 A, filed Jan. 10, 1998.

* cited by examiner

ELECTRICALLY CONDUCTIVE, OPTICALLY TRANSPARENT POLYMER/CARBON NANOTUBE COMPOSITES AND PROCESS FOR PREPARATION THEREOF

CLAIM OF BENEFIT OF PROVISIONAL APPLICATION

Pursuant to 35 U.S.C. §119, the benefit of priority from provisional application Ser. No. 60/336,109, entitled "Electrically Conductive, Optically Transparent Aromatic Polymer/Carbon Nanotube Composites And Process For Preparation Thereof," with a filing date of Nov. 2, 2001, is claimed for this non-provisional application.

ORIGIN OF INVENTION

The invention described herein was jointly made by employees of the U.S. Government, contract employees and employees of the National Research Council, and may be manufactured and used by or for the government for governmental purposes without the payment of royalties thereon or therefor.

BACKGROUND OF THE INVENTION

1. Field of the Invention

The present invention is directed to methods of preparation that effectively disperse carbon nanotubes into polymer matrices, and the novel nanocomposites that result therefrom.

2. Description of the Related Art

Since carbon nanotubes (CNTs) were discovered in 1991 (S. Iijima, *Nature* 354 56, 1991), significant interest has been generated due to their intrinsic mechanical, electrical, and thermal properties (P. M. Ajayan, *Chem. Rev.* 99 1787, 1999). Early studies focused on CNT synthesis and theoretical prediction of physical properties. Due to the recent development of efficient CNT synthesis (A. Thess et al., *Science* 273 483, 1996) and purification procedures (A. G. Rinzler et al., *Appl. Phys. A* 67 29, 1998), some applications have been realized. However, these applications have relied on the use of pure CNTs, not nanocomposites. Examples include a carbon nanoprobe in scanning probe microscopy (S. S. Wong et al., *J. Am. Chem. Soc.* 120 603, 1998), single wall carbon nanotube (SWNT) transistor (S. J. Tans et al., *Nature* 393 49, 1998), and field emission display (Q. H. Wang et al., *Appl. Phys. Lett.* 70 3308, 1997). There have been very few reports on the development of nanocomposites using CNTs as reinforcing inclusions in a polymer matrix primarily because of the difficulty in dispersing the nanotubes. This difficulty is partially due to the non-reactive surface of the CNT. A number of studies have concentrated on the dispersion of CNTs, but complete dispersion of the CNTs in a polymer matrix has been elusive due to the intrinsicly strong van der Waals attraction between adjacent tubes. In practice, attempts to disperse CNTs into a polymer matrix leads to incorporation of agglomerates and/or bundles of nanotubes that are micron sized in thickness and, consequently, they do not provide the desired and/or predicted property improvements. Most of the dispersion related studies have focused on modifying the CNT surface chemistry. Many researchers have studied the functionalization of CNT walls and ends. One example is fluorination of CNT surfaces (E. T. Mickelson et al., *J. Phys. Chem.* 103 4318, 1999), which can subsequently be replaced by an alkyl group to improve the solubility in an organic solvent. Although many researchers have tried to functionalize CNT ends and exterior walls (as a means to increase solubility) by various approaches such as electrochemistry and wrapping with a functionalized polymer, the solubility of these modified tubes was very limited. Other methods of CNT modification include acid treatment (i.e. oxidation) and use of surfactants as a means of improving solubility and compatibility with organic polymers. It has been noted that modifications of the nanotube chemical structure may lead to changes in intrinsic properties such as electrical conductivity (X. Gong et al., *Chem. Mater.,* 12 1049, 2000). Ultrasonic treatment has also been used as a means to disperse CNTs in a solvent. Upon removal of the sonic force, the tubes agglomerate and settle to the bottom of the liquid.

Individual SWNTs can exhibit electrical conductivity ranging from semi-conductor to metallic depending on their chirality, while the density is in the same range of most organic polymers (1.33–1.40 g/cm$^3$). In the bulk, they form a pseudo-metal with a conductivity of approximately 10$^5$ S/cm (Kaiser et al., *Physics Reviews B,* 57, 1418 1998). The conductive CNTs have been used as conductive fillers in a polymer matrix to enhance conductivity, however the resulting nanocomposites exhibited little or no transparency in the visible range (400–800 nm). Coleman et al., (*Physical Review B,* 58, R7492, 1998) and Curran et al., (*Advanced Materials,* 10, 1091, 1998) reported conjugated polymer-CNT composites using multi-wall CNTs, which showed that the percolation concentration of the CNTs exceeded 5 wt %. The resulting nanocomposites were black with no transparency in the visible region. Shaffer and Windle (*Advanced Materials,* 11, 937, 1999) reported conductivity of a multi-wall CNT/poly (vinyl alcohol) composite, which also showed percolation above 5 wt % nanotube loading and produced a black nanocomposite. The same group (J. Sandler, M. S. P. Shaffer, T. Prasse, W. Bauhofer, K. Schulte, and A. H. Windle, *Polymer* 40, 5967, 1999) reported another multi-wall CNT composite with an epoxy, which achieved percolation below 0.04 wt %. An optical micrograph of the CNT/epoxy composite was reported, which revealed that the CNT phase was separated from the epoxy resin, showing several millimeters of resin-rich domains. The dispersion of CNTs in this material was very poor. This agglomeration of CNTs in selected areas in the composite could explain the high conductivity observed since it provides the "shortest path" for the current to travel. Preliminary measurements of the conductivity of a CNT/poly (methyl methacrylate) (PMMA) composite were measured on a fiber (R. Haggenmueller, H. H. Gommans, A. G. Rinzler, J. E. Fischer, and K. I. Winey, *Chemical Physics Letters,* 330, 219, 2000). The level of conductivity was relatively high (1.18×10$^{-3}$ S/cm) at 1.3 wt % SWNT loading. However, the optical transparency in the visible range was not determined for the fiber sample. The mechanical properties of these fibers were much less than the predicted value, which implies that the CNTs were not fully dispersed.

The present invention is directed to methods of preparation that overcome the shortcomings previously experienced with the dispersion of CNTs in polymer matrices and the novel compositions of matter produced therefrom. The resulting nanocomposites exhibit electrical conductivity, improved mechanical properties, and thermal stability with high retention of optical transparency in the visible range.

SUMMARY OF THE INVENTION

Based on what has been stated above, it is an objective of the present invention to effectively disperse CNTs into polymer matrices. It is a further objective to prepare novel polymer/CNT nanocomposites and articles derived therefrom.

Methods of preparation that were evaluated include: (1) low shear mixing of a polymer solution with CNTs dispersed in an organic solvent; (2) high shear mixing (e.g., homogenizer or fluidizer) of a polymer solution with CNTs dispersed in an organic solvent; (3) ultrasonic mixing (e.g., sonic horn at 20–30 kHz for 1–10 minutes) of a polymer solution with CNTs dispersed in an organic solvent; (4) high shear mixing (e.g., homogenizer, fluidizer, or high speed mechanical stirrer) of a polymer solution with CNTs dispersed in an organic solvent with subsequent ultrasonic mixing (e.g., sonic horn at 20–30 kHz for 1–10 minutes); (5) synthesis of the polymer in the presence of pre-dispersed CNTs; and (6) synthesis of the polymer in the presence of pre-dispersed CNTs with simultaneous sonication (e.g., 40–60 kHz in a water bath) throughout the entire synthesis process. Methods (4), (5) and (6) are applicable to a variety of polymers that can be synthesized in a solvent in the presence of the CNTs.

The resulting polymer/CNT materials exhibit a unique combination of properties that make them useful in a variety of aerospace and terrestrial applications, primarily because of their combination of improved mechanical properties, thermal stability, electrical conductivity, and high optical transmission. Examples of space applications include thin film membranes on antennas, second-surface mirrors, thermal optical coatings, and multi-layer thermal insulation (MLI) blanket materials. For these applications, materials that do not build-up electrical charge are preferred. In addition to exhibiting electrical conductivity, some of these space applications also require that the materials have low solar absorptivity and high thermal emissivity. Terrestrial applications include electrically conductive coatings on a variety of substrates, electrostatic dissipative coatings on electromagnetic displays, coatings for use in luminescent diodes, antistatic fabrics, foams, fibers, threads, clothing, carpeting and other broad goods.

DETAILED DESCRIPTION OF THE INVENTION

Figure 1:
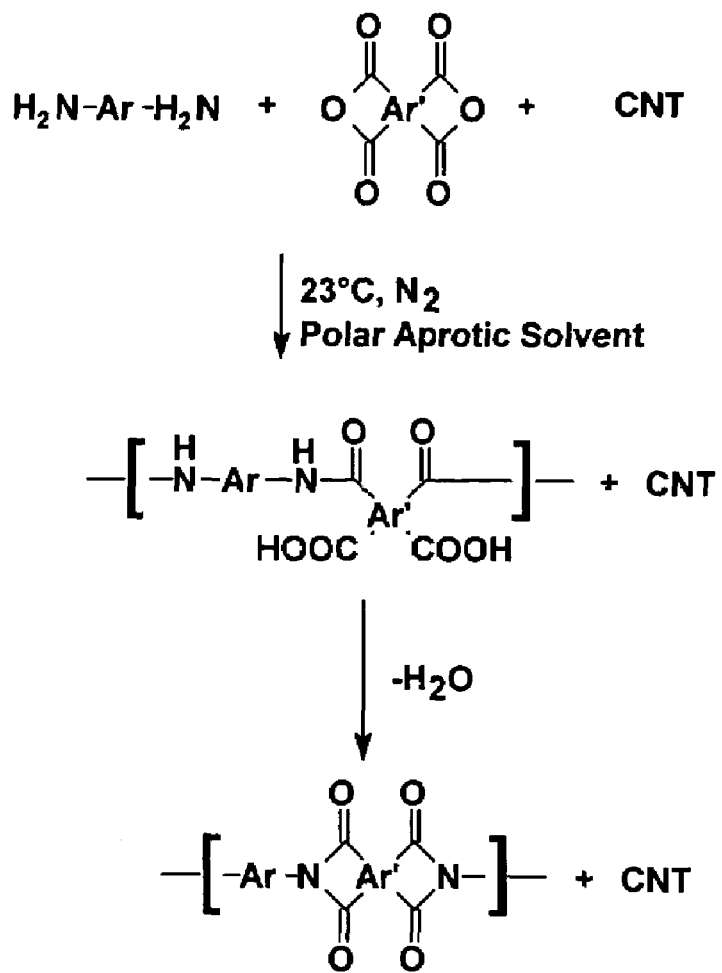
FIG. 1 illustrates preparation of an aromatic poly(amide acid)/CNT and polyimide/CNT nanocomposite.

The present invention involves the preparation of polymer/CNT composites with a unique combination of properties. The methods of preparation effectively disperse the CNTs into polymer matrices and overcome shortcomings of previous efforts to effectively disperse CNTs into polymers. The methods were successful using both single wall carbon nanotubes (SWNTs) and multi-wall carbon nanotubes (MWNTs). Within the scope of the present invention, the term CNT(s) designates both SWNTs and MWNTs. The resulting nanocomposites exhibit a unique combination of properties, such as high retention of optical transparency in the visible range, electrical conductivity, high mechanical properties, and high thermal stability. Appropriate selection of the polymer matrix produces additional desirable properties such as vacuum ultraviolet radiation resistance, atomic oxygen resistance, high $T_g$, excellent flexibility and high toughness. Of particular significance is the ability to fabricate freestanding films as well as coatings that exhibit an excellent and extremely useful combination of good optical transparency, electrical conductivity, high mechanical properties, and thermal stability.

Condensation polymers, such as polyimides, poly(arylene ether)s and poly(amide acids) and aromatic copolymers such as copolyimides, copoly(arylene ether)s and copoly(amide acids) can be used to prepare nanocomposites containing well dispersed CNTs. The methods discussed herein effectively dispersed CNTs into polymer matrices on a nanoscale level such that significant improvements in electrical conductivity could be achieved without significant darkening or reduction in optical transmission in the visible region of the resultant nanocomposite. The following methods of preparation of polymer/CNT nanocomposites were evaluated: 1) low shear mixing of a polymer solution with CNTs dispersed in an organic solvent; 2) high shear mixing (e.g., homogenizer, fluidizer, or high-speed mechanical stirrer) of a polymer solution with CNTs dispersed in an organic solvent; 3) ultrasonic mixing (e.g., sonic horn at 20–30 kHz for approximately 1–10 minutes) of a polymer solution with CNTs dispersed in an organic solvent; 4) high shear mixing (e.g., homogenizer, fluidizer, or high-speed mechanical stirrer) of a polymer solution with CNTs dispersed in an organic solvent with subsequent ultrasonic mixing (e.g., sonic horn at 20–30 kHz for approximately 1–10 minutes); 5) synthesis of the polymer in the presence of pre-dispersed CNTs; and 6) synthesis of the polymer in the presence of pre-dispersed CNTs with simultaneous sonication (e.g., water bath operating at 40 kHz) throughout the entire synthesis process. The effects of these different methods of preparation on electrical conductivity and optical transmission were investigated.

Preparation of Carbon Nanotube Dispersion

Two different types of CNTs were dispersed. The CNTs differed in their method of preparation [either laser ablation (LA) or chemical vapor deposition (CVD)], as well as the average lengths and diameters of the tubes. The LA CNTs were single wall carbon nanotubes (SWNTs) and were obtained from Tubes@Rice as purified dispersions in toluene. The CVD CNTs were multi-wall carbon nanotubes (MWNTs) and were obtained from Nanolab, Inc. CNT dispersions were prepared by placing the CNTs into an organic solvent, preferably at concentrations of less than 1 weight percent (wt %). Although concentrations of less than 1 wt % are preferred, concentrations of up to about 3% may be used for thin films (i.e., less than approximately 5 μm thick) while still achieving retention of optical transparency. The liquid to disperse the CNTs was chosen based on its compatibility and solvating characteristics with the monomers and polymer of interest. Preferably, polar aprotic solvents were selected that were also compatible with the polymers to be synthesized. The CNT dispersion was mixed mechanically, as appropriate, with a high-speed, high-shear instrument (e.g., homogenizer, fluidizer, or high-speed mechanical stirrer) and was subsequently placed in a glass vessel and immersed in an ultrasonic water bath operating at 40–60 kHz for several 1–10 hours to achieve initial dispersion.

Selection of Polymers

Predominately aromatic and conjugated polymers are generally preferred for use in the preparation of polymer/CNT nanocomposites for long-term aerospace applications owing to their high-temperature resistance and high durabilities. Representative aromatic polymers and copolymers, representing the poly(amide acid), polyimide and poly(arylene ether) families, were selected based upon their solubility in several polar aprotic solvents of choice and their ability to be synthesized in the presence of the CNTs without any deleterious effects on molecular weight build-up as evidenced by a noticeable increase in solution viscosity. In some cases, target polymers with polar groups such as carbonyl, cyano, phosphine oxide, sulfone and others or conjugated polymers were selected to provide additional compatibility with CNTs. In some cases, polymers with very high optical transmission (i.e. greater than approximately 85%) at 500 nm were selected to demonstrate this approach. Particularly good results, with respect to degree of dispersion, were obtained with aromatic polymers containing polar groups.

Methods of Preparation of Composites

Several methods of preparing polymer/CNT composites were evaluated and are described in detail below.

Method (1) (Low Shear Mixing)

Low shear mixing of a pre-synthesized high molecular weight aromatic polymer solution with CNTs dispersed in an organic solvent was conducted by preparing a polymer solution in a solvent and subsequently adding the CNT dispersion (prepared as previously described). A mechanical stirrer was used to mix the two components. This approach typically resulted in poor mixing and poor dispersion. The CNTs separated from solution upon removal of the mechanical agitation. The resulting film and/or coating were black in color and exhibited poor retention of optical transmission (i.e., less than approximately 35% retention of optical transmission) at 500 nm. Optical microscopic examination of the nanocomposite film showed the presence of agglomerates of CNT bundles indicating poor dispersion.

Method (2) (High Shear Mixing)

High shear mixing (e.g., using homogenizer, fluidizer, or high-speed mechanical stirrer) of a pre-synthesized high molecular weight aromatic polymer solution with CNTs dispersed in an organic solvent was conducted by preparing a polymer solution in a solvent and subsequently adding the CNT dispersion (prepared as previously described). A flat bottom generator equipped with a homogenizer operating at about 7500 revolutions per minute (rpm) was used for approximately 20 minutes to mix the two components. Experiments were undertaken to study the effect of homogenization time on level of dispersion. Longer homogenization times (>1 hour) did not provide significant improvement in mixing and dispersion as compared to shorter times (<1 hour). This approach typically resulted in better mixing and dispersion as compared to Method (1), but the resulting nanocomposite films and/or coatings were black and exhibited poor retention of optical transmission (i.e., less than approximately 35% retention of optical transmission) at 500 nm. Optical microscopic examination of the nanocomposite film showed the presence of agglomerates of CNT bundles indicating poor dispersion.

Method (3) (Ultrasonic Mixing With Sonic Horn)

Ultrasonic mixing of a pre-synthesized high molecular weight aromatic polymer solution with CNTs dispersed in an organic solvent was conducted by preparing a polymer solution in a solvent and subsequently adding the CNT dispersion (prepared as previously described). A high power sonic horn equipped with a 13 mm probe operating at 20 kHz was used to mix the two components. Experiments were undertaken to study the effect of ultrasonic treatment time on level of dispersion. Longer ultrasonic treatment times (>10 min.) did not provide significant improvement in mixing and dispersion as compared to shorter ultrasonic treatment times (<10 min.). This high power ultrasonic treatment appeared to cause significant damage to the polymer as evidenced by a noticeable decrease in solution viscosity. This observation suggests that chemical bond cleavage is occurring that subsequently leads to a reduction in molecular weight. The possibility also exists that this high power ultrasonic treatment may cause damage (i.e., introduction of defect sites through carbon-carbon bond cleavage) to the CNTs. Modification of the chemical structure of CNTs is known to cause bulk property changes, thus this method was deemed undesirable. Nanocomposite films and/or coatings prepared from solutions that received relatively short exposures (<10 min.) to the high power sonic horn treatment exhibited improvements in electrical conductivity of 10–12 orders of magnitude; however the nanocomposite films and/or coatings exhibited moderate retention of optical transparency (i.e., 35–50% retention of optical transmission) in the visible range. Optical microscopic examination of the nanocomposite film showed the presence of agglomerates of CNT bundles indicating poor dispersion. Based on a qualitative assessment, the nanocomposite film prepared via this method exhibited marginally improved dispersion relative to the nanocomposite films prepared via Methods (1) and (2).

Method (4) (High Shear and Ultrasonic Mixing Using Sonic Horn)

A combination of high shear mixing and ultrasonic treatment was conducted by initially preparing an aromatic polymer solution in a solvent and subsequently adding the CNT dispersion (prepared as previously described). A homogenizer was subsequently used to mix the dispersion, followed by ultrasonic treatment with a high power sonic horn operated at 20 kHz. The times of each treatment were varied, but no significant differences in dispersion were apparent. This combination treatment generally gave better dispersion than one single component mixing. Nanocomposite films and/or coatings with 0.1 wt % CNT exhibited improvements in electrical conductivity of 10–12 orders of magnitude compared to a pristine polymer film. However, the nanocomposite films and/or coatings exhibited moderate retention of optical transparency (i.e., 35–50% retention of optical transmission) at 500 nm. Optical microscopic examination of the nanocomposite film showed the presence of agglomerates of CNT bundles, indicating poor dispersion. Based on a qualitative assessment, the nanocomposite film prepared via this method exhibited marginally improved dispersion relative to the nanocomposite films prepared via Methods (1) and (2).

Method (5) (Synthesis of the Polymer in the Presence of Pre-Dispersed CNTs)

Synthesis of an aromatic polymer in the presence of the CNTs was conducted by pre-dispersing the CNTs in the solvent of interest and subsequently adding the monomers. In the case of the poly(amide acid)s and polyimides, the diamine component was added first to the predispersed CNTs and allowed to be stirred until dissolved. The dianhydride component was subsequently added as a solid and the progression of the polymerization was readily observable by a significant build-up in solution viscosity. The re-aggregation among the CNTs are inhibited and/or minimized due to the high viscosity of the solution, which preserves the state of CNT dispersion during further required processing. The polymerization was allowed to proceed under conditions analogous to those generally used for the particular polymer type using a mechanical stirrer (i.e., under low shear). Nanocomposite films and/or coatings with 0.1 wt % CNT exhibited improvements in electrical conductivity of 10–12 orders of magnitude compared to a pristine polymer film and a high retention of optical transparency (greater than 50%) at 500 nm. Optical microscopic examination of the nanocomposite film showed the presence of CNT bundles and agglomerates of bundles. However, the bundles were of a smaller size than those observed in nanocomposite films prepared by Methods (1)–(4). Based on a qualitative assessment, the nanocomposite film prepared via this method exhibited significantly improved dispersion relative to the nanocomposite films prepared via Methods (1)–(4). Optionally, the solution obtained by Method (5) may be filtered to remove extraneous particles or large agglomerates of CNT bundles.

Method (6) (Synthesis of the Polymer in the Presence of Pre-dispersed CNTs with Simultaneous Ultrasonic Treatment)

A combination method of preparation involving synthesis of the polymer in the presence of the CNTs while simultaneously applying ultrasonic treatment using a low power water bath operating at 40 kHz throughout the entire synthesis process was investigated. This method involved synthesis of the polymer in the presence of pre-dispersed CNTs as described in Method (5), but the reaction vessel was immersed in an ultrasonic bath throughout the entire synthesis. It should be noted that in contrast to Methods (3) and (4), which used a high power sonic horn operating at 20 kHz (100–750 Watt/cm$^2$), the ultrasonic bath operates at a much lower level of power (less than 10 Watt/cm$^2$) and at a higher frequency (40 kHz). Based on the observed increase in solution viscosity (indicating high molecular weight polymer formation) and microscopic analysis of the nanocomposite films, the use of the ultrasonic bath operating at 40 kHz did not cause any observable degradation of the CNTs, nor did it affect the formation of high molecular weight polymer. Nanocomposite films and/or coatings with 0.1 wt % CNT exhibited improvements in electrical conductivity of 10–12 orders of magnitude compared to a pristine polymer film and a high retention of optical transparency (i.e., greater than about 50%) at 500 nm. Optical microscopic examination of the nanocomposite film showed the presence of CNT bundles and agglomerates of bundles. However, the bundles were of a smaller size than those observed in nanocomposite films prepared by methods (1)–(4). Based on a qualitative assessment, the nanocomposite film prepared via this method exhibited significantly improved dispersion relative to the nanocomposite films prepared via Methods (1)–(4). Optionally, the solution obtained by Method (6) may be filtered to remove extraneous particles or large agglomerates of CNT bundles.

Figure 2:
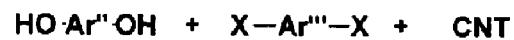
FIG. 2 illustrates preparation of an aromatic poly(arylene ether)/CNT nanocomposite.
Figure 2:
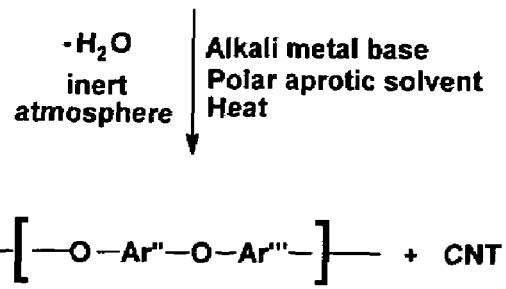

Performing synthesis of the polymers [i.e., Methods (5) and (6)] in the presence of the CNTs provided significant improvement in the dispersion of the CNTs, provided the smallest decrease in optical transmission, provided an equal or better electrical conductivity compared to a pristine polymer film and provided a stable solution. Attempts to mix a pre-synthesized high molecular weight aromatic polymer solution with a CNT dispersion was unsuccessful in achieving good dispersion and high retention of optical transmission. Methods (5) and (6) are applicable to various condensation polymers such as poly(amide acid), polyimide and poly(arylene ethery)/CNT nanocomposites as shown in FIGS. 1 and 2. FIG. 1 illustrates the preparation of polyimide and poly(amide acid))/CNT nanocomposites, wherein Ar and Ar' can be any aromatic moiety. FIG. 2 illustrates the preparation of poly(arylene ether)/CNT composites, wherein Ar" represents any aromatic moiety, X represents a leaving group such as a halogen, nitro or other suitable group and Ar''' represents any electron withdrawing group or ring system.

EXAMPLES

The following specific examples are provided for illustrative purposes and do not serve to limit the scope of the invention.

Example 1A

Preparation of 0.1 wt % CNT/Polyimide Nanocomposite from 1,3-bis(3-aminophenoxy) benzene (APB) and 4,4'-perfluoroisopropylidiene dianhydride (6FDA) by Method (6)

Figure 3:
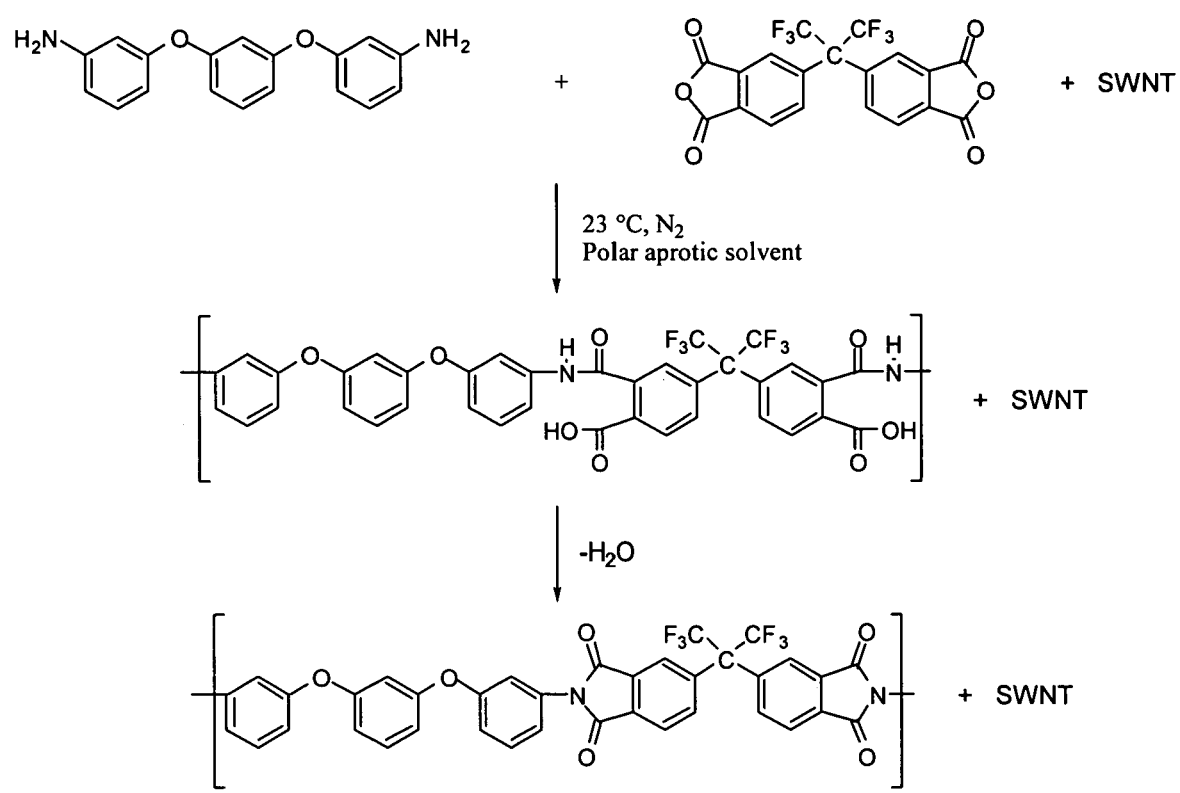
FIG. 3 illustrates preparation of a 0.1 wt % CNT/polyimide nanocomposite from 1,3-bis(3-aminophenoxy) benzene (APB) and 4,4'-perfluoroisopropylidiene dianhydride (6FDA).

FIG. 3 illustrates preparation of 0.1 wt % LA-NT/polyimide nanocomposite from APB and 6 FDA by Method (6).

Purified SWNTs obtained from Tubes@Rice as a dispersion in toluene were used as the conductive inclusions. A dilute SWNT solution, typically approximately 0.01% weight/volume (w/v) in N,N-dimethylformamide (DMF), was prepared by replacing the toluene with DMF by centrifuging and decanting several (typically three) times. Pure CNT powders could also be used, eliminating the previous step. The dilute SWNT solution was homogenized for 10 min. and sonicated for 1 hour in a ultrasonic bath operating at 40 kHz. If a higher power sonic bath is used, sonication time can be reduced depending on the power. Sonication time should be also adjusted depending on the quality of CNTs. The sonicated SWNT solution (2 mL, 0.01 g of the solid SWNT) was transferred into a 100 mL three neck round bottom flask equipped with a mechanical stirrer, nitrogen gas inlet, and drying tube outlet filled with calcium sulfate. The flask was immersed in the ultrasonic bath throughout the entire synthesis procedure. APB (3.9569 g, 1.353×10$^{-2}$ mol) was added into the flask along with 20 mL of DMF while stirring under sonication. After approximately 30 min. of stirring the SWNT and diamine mixture, 6FDA (6.0432 g, 1.360×10$^{-2}$ mol) was added along with additional 30.5 mL of DMF with stirring under sonication. The dark mixture was stirred in the sonic bath overnight, approximately 12 hours, to give a 0.1% by weight SWNT/poly(amide acid) solution. During the course of the reaction, a noticeable increase in solution viscosity was observed. The concentration of the SWNT/poly(amide acid) was 16% solids (w/w) in DMF. The SWNT/poly(amide acid) solution was treated with acetic anhydride (4.1983 g, 4.080×10$^{-2}$ mol) and pyridine (3.2273 g, 1.360×10$^{-2}$ mol) to effect imidization. The resulting solution was cast onto plate glass and placed in a dry air box for 24 hours to give a tack-free film. This film was thermally treated (to remove solvent) for 1 hour each at 110, 170, 210 and 250° C. in a forced air oven. The film was removed from the glass and characterized.

Example 1B

Film was prepared in a manner identical to that described for EXAMPLE 1A, except that the SWNT concentration in the polyimide was 0.2% by weight.

Example 1C

Film was prepared in a manner identical to that described for EXAMPLE 1A, except that the SWNT concentration in the polyimide was 0.5% by weight.

Example 1D

Film was prepared in a manner identical to that described for EXAMPLE 1A, except that the SWNT concentration in the polyimide was 1.0% by weight.

Example 1E

Film was prepared in a manner to that described for EXAMPLE 1D, except that Method (1) was employed instead of Method (6).

EXAMPLE 2

Preparation of 0.1 wt % LA-NT/Polyimide Nanocomposite from 2,6-bis(3-aminophenoxy) benzonitrile [(β-CN)APB] and 3,3',4,4'-oxydiphthalic dianhydride (ODPA) by Method (6)

Figure 4:
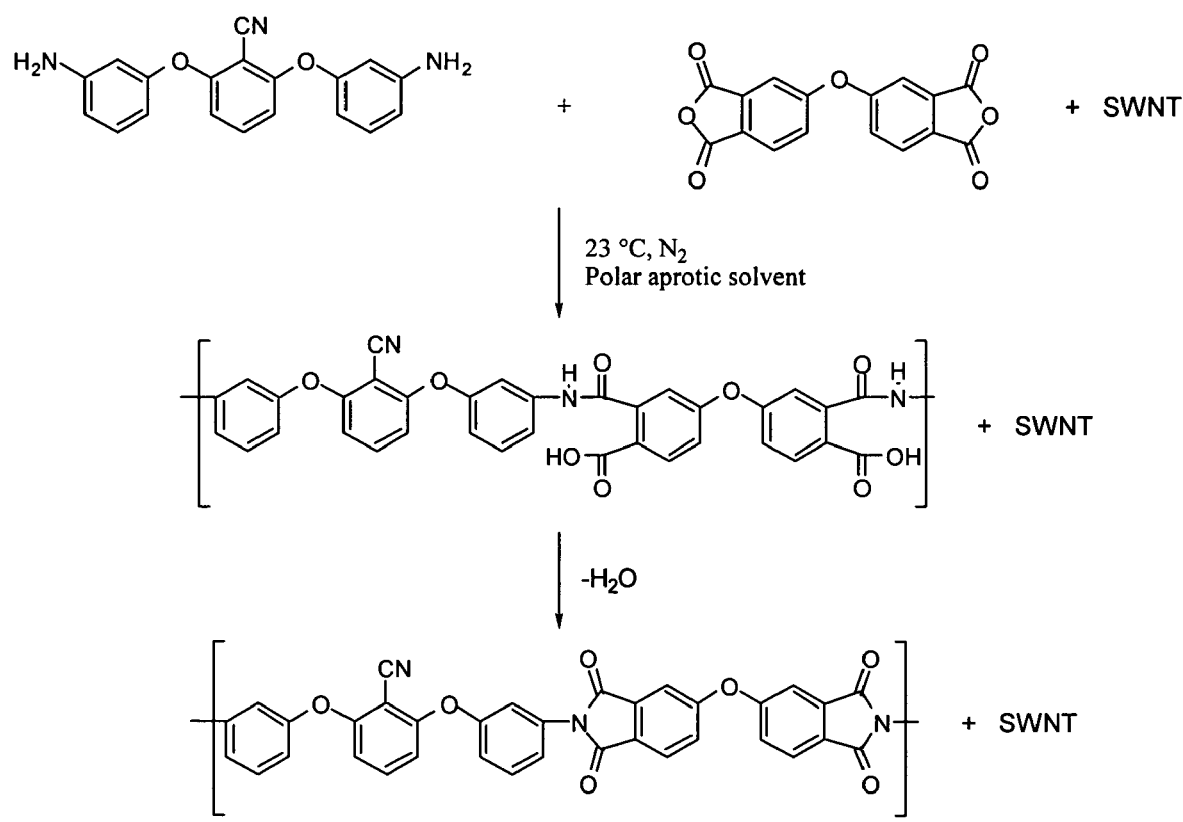
FIG. 4 illustrates preparation of a 0.1 wt % SWNT/polyimide nanocomposite from 2,6-bis(3-aminophenoxy) benzonitrile [(β-CN)APB] and 3,3',4,4'-oxydiphthalic dianhydride (ODPA).

FIG. 4 illustrates the preparation of 0.1 wt % LA-NT/polyimide nanocomposite from 2,6-bis(3-aminophenoxy) benzonitrile [(β-CN)APB] and ODPA by Method (6).

Purified SWNTs obtained from Tubes@Rice as a dispersion in toluene were used as the conductive inclusions. A dilute SWNT solution, generally about 0.01% w/v in N,N-dimethylacetamide (DMAc), was prepared by replacing the toluene with DMAc by centrifuging and decanting several (typically three) times. The dilute SWNT solution was homogenized for 10 min. and sonicated for 1 hour in an ultrasonic bath operating at 40 kHz. The SWNT solution (2 mL, 0.01 g of the solid SWNT) was transferred into a 100 mL three neck round bottom flask equipped with a mechanical stirrer, nitrogen gas inlet, and drying tube outlet filled with calcium sulfate. The flask was immersed in the ultrasonic bath during the entire reaction. (β-CN)APB, (5.0776 g, 1.60×10$^{-2}$ mol) was subsequently added to the flask along with 20 mL of DMAc while stirring under sonication. After approximately 30 min., ODPA (4.9635 g, 1.60×10$^{-2}$ mol) was added along with an additional 30.5 mL of DMAc. The dark mixture was stirred under sonication overnight, approximately 12 hours, to give a 0.1 wt % SWNT/poly(amide acid) solution. During the course of the reaction, a noticeable increase in solution viscosity was observed. The concentration of the solid SWNT/poly(amide acid) was 16% (w/w) in DMAc. The SWNT/poly(amide acid) solution was treated with acetic anhydride (4.1983 g, 4.080×10$^{-2}$ mol) and pyridine (3.2273 g, 1.360×10$^{-2}$ mol) to effect imidization. The resulting solution was cast onto plate glass and placed in a dry air box for 24 hours to give a tack-free film. This film was thermally treated (to remove solvent) for 1 hour each at 50, 150, 200 and 240° C. in a nitrogen oven. The film was removed from the glass and characterized.

Example 3

Preparation of a 0.1% wt/wt LA-NT/Polyimide Nanocomposite from [2,4-bis(3-aminophenoxy)phenyl]diphenylphosphine oxide (APB-PPO) and ODPA by Method (5)

Figure 5:
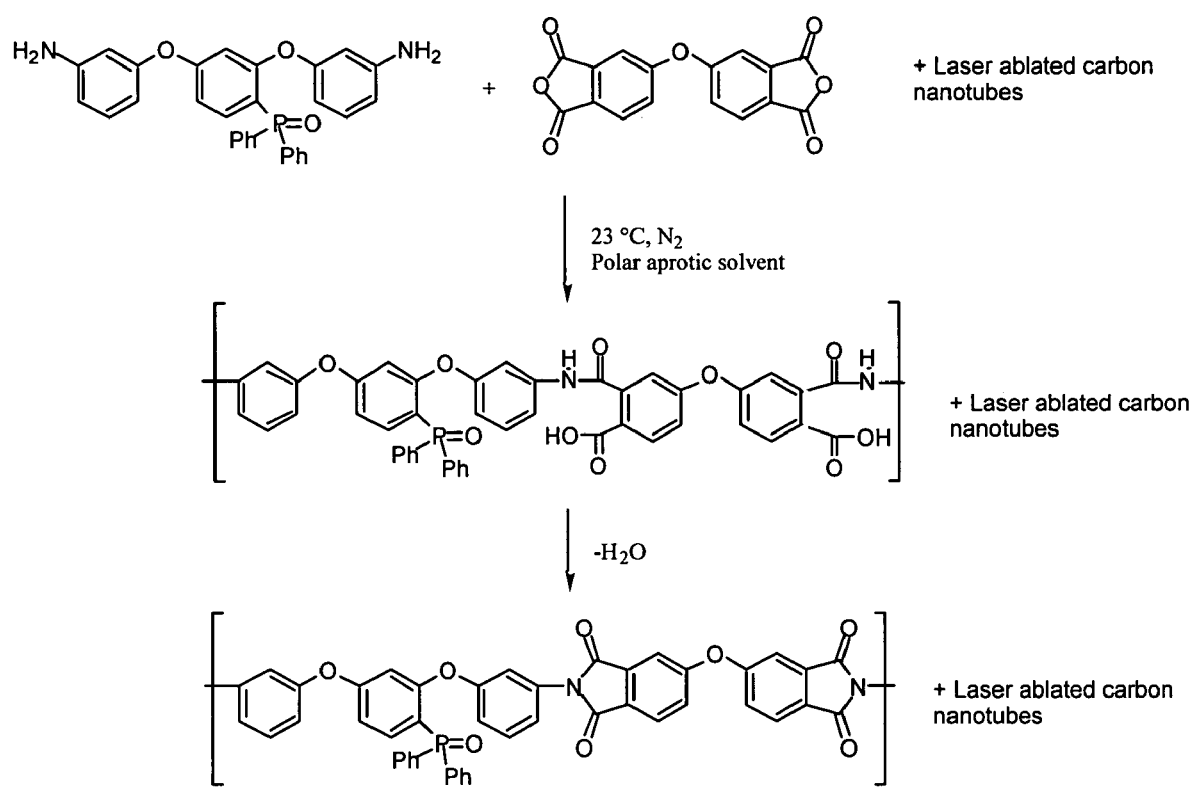
FIG. 5 illustrates preparation of a 0.1% wt/wt LA-NT/polyimide nanocomposite from [2,4-bis(3-aminophenoxy)phenyl]diphenylphosphine oxide (APB-PPO) and ODPA.

FIG. 5 illustrates preparation of a 0.1% wt/wt LA-NT/polyimide nanocomposite APB-PPO and ODPA by Method (5).

A glass vial containing 0.0060 g of nanotubes and 10 mL DMF was placed in an ultrasonic bath operating at 40 kHz for periods ranging from 16 to 24 hours. A 100 mL three neck round bottom flask equipped with a mechanical stirrer, nitrogen gas inlet, and drying tube filled with calcium sulfate was charged with APB-PPO (3.6776 g, 7.467×10$^{-3}$ mole) and DMF (5.0 mL). Once the diamine dissolved, the DMF/SWNT mixture was added and the resulting mixture was stirred for 20 mins. ODPA (2.3164 g, 7.467×10$^{-3}$ mole) was added along with additional DMF (8.2 mL) to give a solution with a concentration of 20% (w/w) solids and a nanotube concentration of 0.1% wt/wt. The mixture was stirred overnight at room temperature under a nitrogen atmosphere. During the course of the reaction a noticeable increase in solution viscosity was observed. The poly(amide acid) was chemically imidized by the addition of 2.31 g of acetic anhydride and 1.77 g of pyridine. The reaction mixture was stirred at room temperature overnight under a nitrogen atmosphere. The polyimide/nanomaterial mixture was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for 1 hour each at 100, 150, 175 and 225° C. to remove solvent. The film was subsequently removed from the glass and characterized.

Example 4

Preparation of a 0.2% wt/wt LA-NT/Polyimide Nanocomposite from APB-PPO and ODPA via Method (5)

Figure 6:
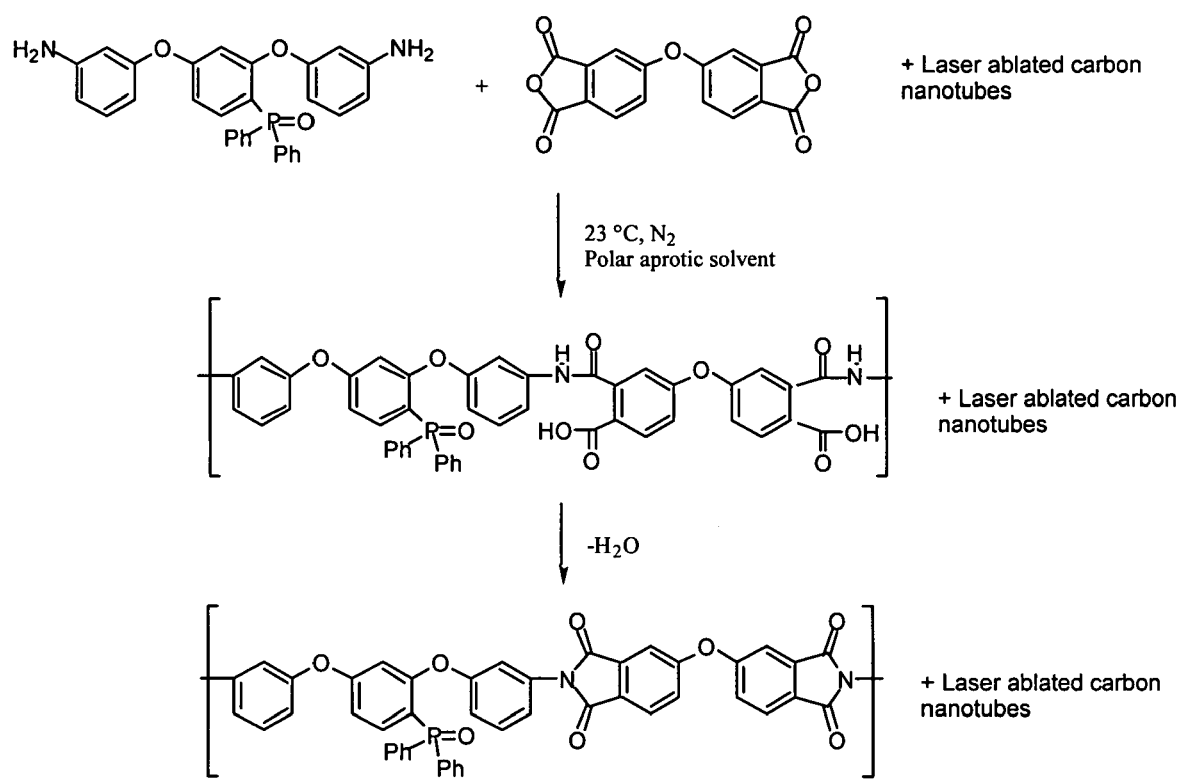
FIG. 6 illustrates preparation of a 0.2% wt/wt LA-NT/polyimide nanocomposite from APB-PPO and ODPA.

FIG. 6 illustrates preparation of a 0.2% wt/wt LA-NT/polyimide nanocomposite from APB-PPO and ODPA Via Method (5).

A glass vial containing 0.0120 g of LA-NT nanotubes and 10 mL of DMF was placed in an ultrasonic bath operating at 40 kHz for periods ranging from 16 to 24 hours.

A 100 mL three neck round bottom flask equipped with a mechanical stirrer, nitrogen gas inlet, and drying tube filled with calcium sulfate was charged with APB-PPO (3.6776 g, 7.467×10$^{-3}$ mole) and DMF (5.0 mL). Once the diamine dissolved, the DMF/SWNT mixture was added and the resulting mixture was stirred for 20 min. ODPA (2.3164 g, 7.467×10$^{-3}$ mole) was added along with additional DMF (8.2 mL) to give a solution with a concentration of 20% (w/w) solids and a nanotube concentration of 0.2% wt/wt. The mixture was stirred overnight at room temperature under a nitrogen atmosphere. The poly(amide acid) was chemically imidized by the addition of 2.31 g of acetic anhydride and 1.77 g of pyridine. The reaction mixture was stirred at room temperature overnight, approximately 12 hours, under a nitrogen atmosphere. During the course of the reaction a noticeable increase in solution viscosity was observed. The polyimide/SWNT mixture was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for 1 hour each at 100, 150, 175 and 225° C. to remove solvent. The film was subsequently removed from the glass and characterized.

Example 5

Preparation of a 0.1% wt/wt CVD-NT-1/Polyimide Nanocomposite from APB-PPO and ODPA by Method (5)

Figure 7:
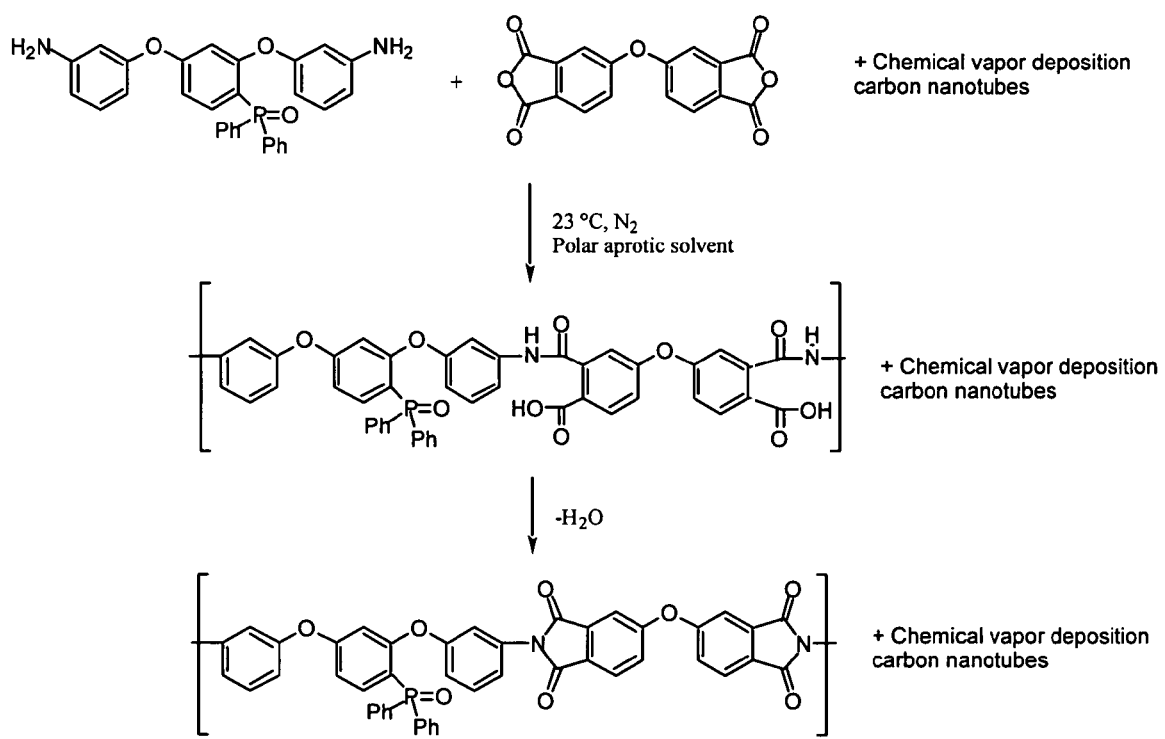
FIG. 7 illustrates preparation of a 0.1% wt/wt CVD-NT-1/polyimide nanocomposite from APB-PPO and ODPA.

FIG. 7 illustrates the preparation of a 0.1% wt/wt CVD-NT-1/polyimide nanocomposite from APB-PPO and ODPA by Method (5).

A glass vial containing 0.0060 g of CVD-NT-1 nanotubes and 10 mL of DMF was placed in an ultrasonic bath at 40 kHz for periods ranging from 16 to 24 hours. A 100 mL three neck round bottom flask equipped with a mechanical stirrer, nitrogen gas inlet, and drying tube filled with calcium sulfate was charged with APB-PPO (3.6776 g, $7.467 \times 10^{-3}$ mole) and DMF (5.0 mL). Once the diamine dissolved, the DMF/CNT mixture was added and the resulting mixture was stirred for 20 min. ODPA (2.3164 g, $7.467 \times 10^{-3}$ mole) was added along with additional DMF (8.2 mL) to give a solution with a concentration of 20% (w/w) solids and a nanotube concentration of 0.1% wt/wt. The mixture was stirred overnight at room temperature under a nitrogen atmosphere. During the course of the reaction, a noticeable increase in solution viscosity was observed. The poly(amide acid) was chemically imidized by the addition of 2.31 g of acetic anhydride and 1.77 g of pyridine. The reaction mixture was stirred at room temperature overnight # under a nitrogen atmosphere. The polyimide/CNT mixture was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for 1 hour each at 100, 150, 175 and 225° C. to remove solvent. The film was subsequently removed from the glass and characterized.

Example 6

Preparation of a 0.2% wt/wt CVD-NT-1/Polyimide Nanocomposite from APB-PPO and ODPA by Method (5)

Figure 8:
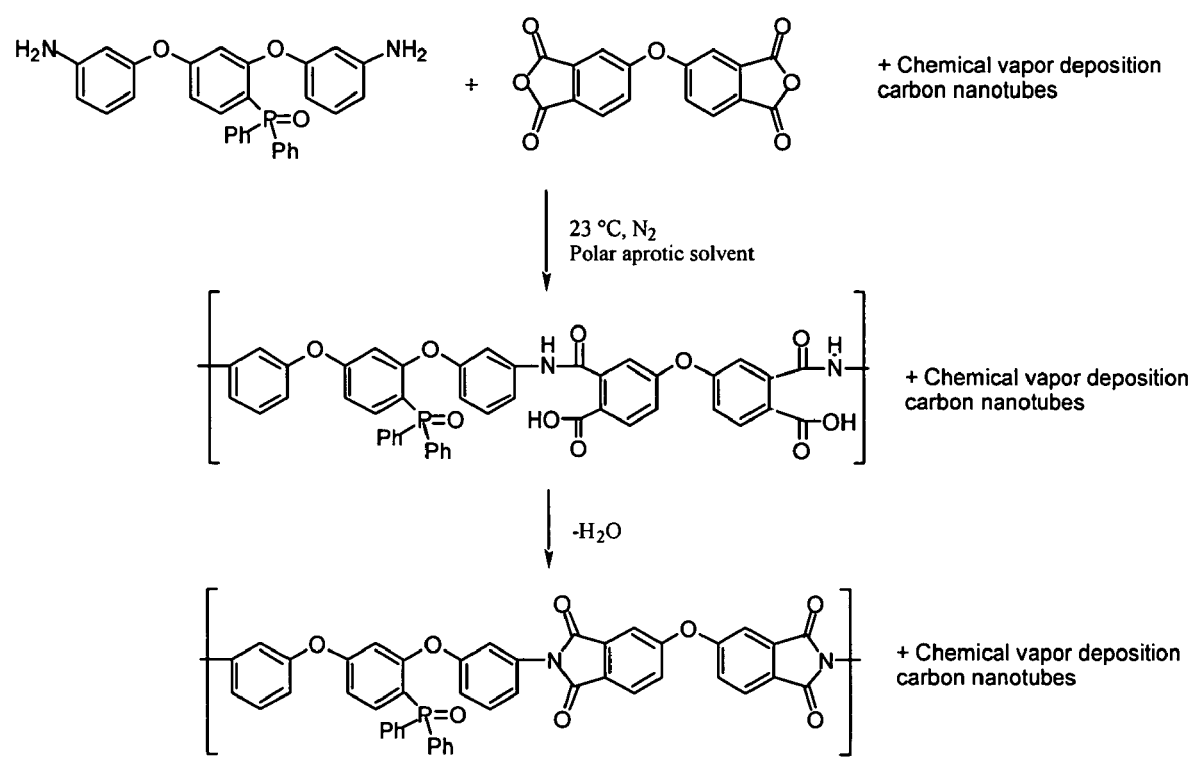
FIG. 8 illustrates preparation of a 0.2% wt/wt CVD-NT-1/polyimide nanocomposite from APB-PPO and ODPA.

FIG. 8 illustrates the preparation of a 0.2% wt/wt CVD-NT-1/polyimide nanocomposite from APB-PPO and ODPA by Method (5).

A glass vial containing 0.0120 g of CVD-NT-1 nanotubes and 10 mL of DMF was placed in an ultrasonic bath operating at 40 kHz for periods ranging from 16 to 24 hours. A 100 mL three neck round bottom flask equipped with a mechanical stirrer, nitrogen gas inlet, and drying tube filled with calcium sulfate was charged with APB-PPO (3.6776 g, $7.467 \times 10^{-3}$ mole) and DMF (5.0 mL). Once the diamine dissolved, the DMF/CNT mixture was added and the resulting mixture was stirred for 20 min. ODPA (2.3164 g, $7.467 \times 10^{-3}$ mole) was added along with additional DMF (8.2 mL) to give a solution with a concentration of 20% (w/w) solids and a nanotube concentration of 0.2% wt/wt. The mixture was stirred overnight at room temperature under a nitrogen atmosphere. During the course of the reaction, a noticeable increase in solution viscosity was observed. The poly(amide acid) was chemically imidized by the addition of 2.31 g of acetic anhydride and 1.77 g of pyridine. The reaction mixture was stirred at room temperature overnight, approximately 12 hours, under a nitrogen atmosphere. The polyimide/CNT solution was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for 1 hour each at 100, 150, 175 and 225° C. to remove solvent. The film was subsequently removed from the glass and characterized.

Example 7

Preparation of a 0.1% wt/wt CVD-NT-2/Polyimide Nanocomposite from APB-PPO and ODPA by Method (5)

Figure 9:
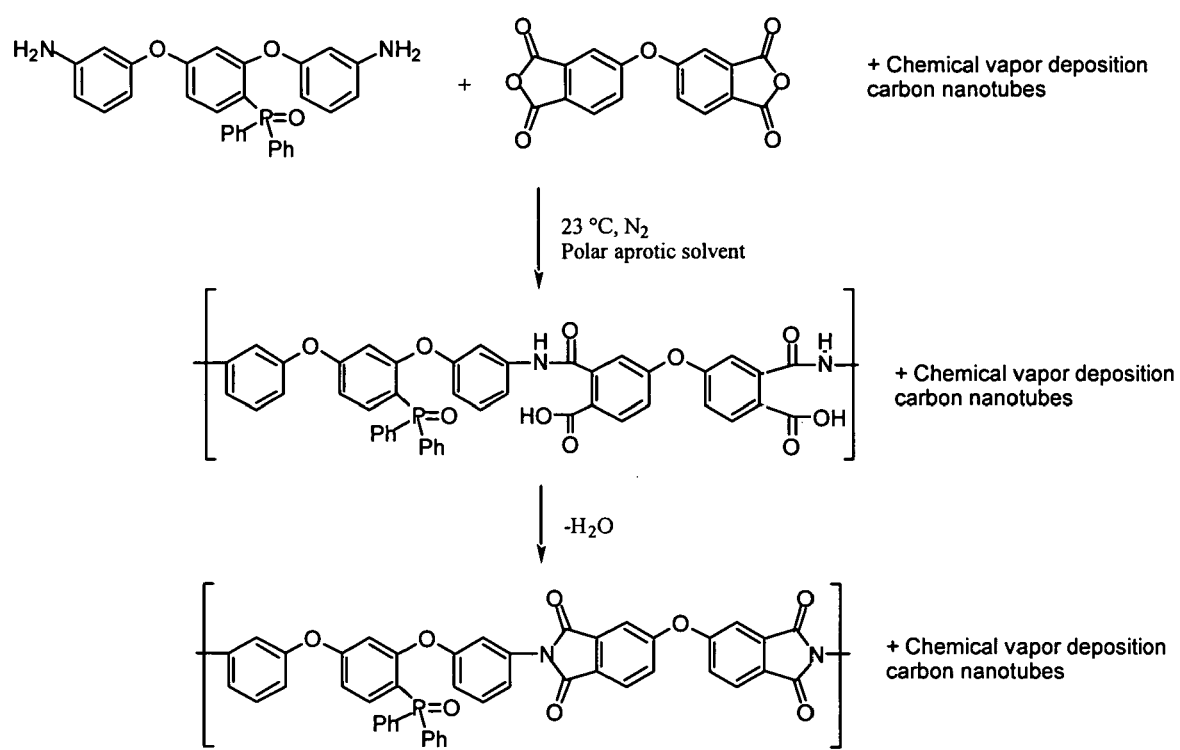
FIG. 9 illustrates preparation of a 0.1% wt/wt CVD-NT-2/polyimide nanocomposite from APB-PPO and ODPA.

FIG. 9 illustrates the preparation of a 0.1% wt/wt CVD-NT-2/polyimide nanocomposite from APB-PPO and ODPA by Method (5).

A glass vial containing 0.0060 g of CVD-NT-2 nanotubes and 10 mL of DMF was placed in an ultrasonic bath operating at 40 kHz for periods ranging from 16 to 24 hours. A 100 mL three neck round bottom flask equipped with a mechanical stirrer, nitrogen gas inlet, and drying tube filled with calcium sulfate was charged with APB-PPO (3.6776 g, $7.467 \times 10^{-3}$ mole) and DMF (5.0 mL). Once the diamine is dissolved, the DMF/CNT mixture was added and the resulting mixture was stirred for 20 minutes. ODPA (2.3164 g, $7.467 \times 10^{-3}$ mole) was added along with additional DMF (8.2 mL) to give a solution with a concentration of 20% (w/w) solids and a nanotube concentration of 0.1% wt/wt. The mixture was stirred overnight, approximately 12 hours, at room temperature under a nitrogen atmosphere. During the course of the reaction, a noticeable increase in solution viscosity was observed. The poly(amide acid) was chemically imidized by the addition of 2.31 g of acetic anhydride and 1.77 g of pyridine. The reaction mixture was stirred at room temperature overnight # under a nitrogen atmosphere. The polyimide/CNT solution was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for one hour each at 100, 150, 175 and 225° C. to remove solvent. The film was subsequently removed from the glass and characterized.

Example 8

Preparation of a 0.2% wt/wt CVD-NT-2/Polyimide Nanocomposite from APB-PPO and ODPA by Method (5)

Figure 10:
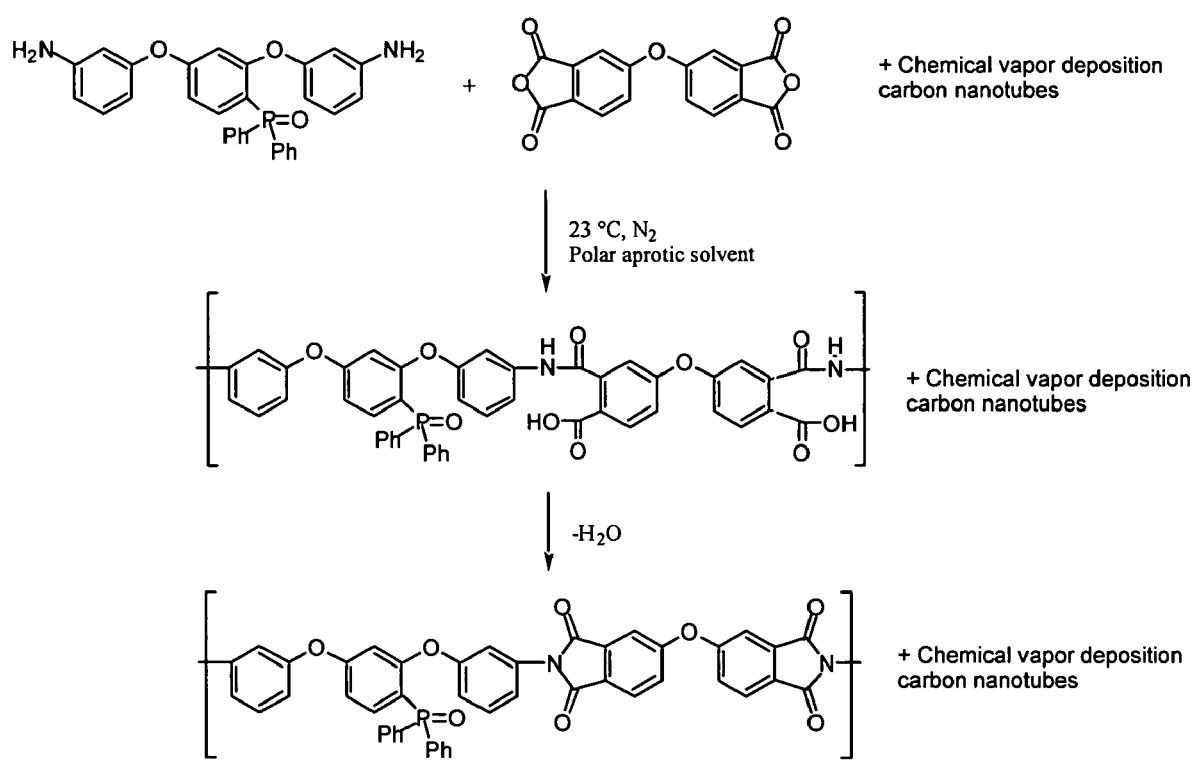
FIG. 10 illustrates preparation of a 0.2% wt/wt CVD-NT-2/polyimide nanocomposite from APB-PPO and ODPA.

FIG. 10 illustrates preparation of a 0.2% wt/wt CVD-NT-2/polyimide nanocomposite from APB-PPO and ODPA by Method (5).

A glass vial containing 0.0120 g of CVD-NT-2 nanotubes and 10 mL of DMF was placed in an ultrasonic bath operating at 40 kHz for periods ranging from 16 to 24 hours. A 100 mL three neck round bottom flask equipped with a mechanical stirrer, nitrogen gas inlet, and drying tube filled with calcium sulfate was charged with APB-PPO (3.6776 g, 7.467×10$^{-3}$ mole) and DMF (5.0 mL). Once the diamime dissolved, the DMF/nanomaterial mixture was added and the resulting mixture was stirred for 20 minODPA (2.3164 g, 7.467×10$^{-3}$ mole) was added along with additional DMF (8.2 mL) to give a solution with a concentration of 20% (w/w) solids and a nanotube concentration of 0.2% wt/wt. The mixture was stirred overnight, approximately 12 hours, at room temperature under a nitrogen atmosphere. During the course of the reaction, a noticeable increase in solution viscosity was observed. The poly(amide acid) was chemically imidized by the addition of 2.31 g of acetic anhydride and 1.77 g of pyridine. The reaction mixture was stirred at room temperature overnight, approximately 12 hours, under a nitrogen atmosphere. The polyimide/CNT solution was precipitated in a blender containing deionized water, filtered, washed with excess water and dried in a vacuum oven at 150° C. overnight to afford a light gray, fibrous material. A solution prepared from DMF or chloroform (20% solids w/w) was cast onto plate glass and allowed to dry to a tack-free state in a dust-free chamber. The film on the glass plate was placed in a forced air oven for one hour each at 100, 150, 175 and 225° C. to remove solvent. The film was subsequently removed from the glass and characterized.

Example 9

Preparation of a 0.1% wt/wt LA-NT/Poly(arylene ether)/SWNT Nanocomposite by Method (5)

Figure 11:
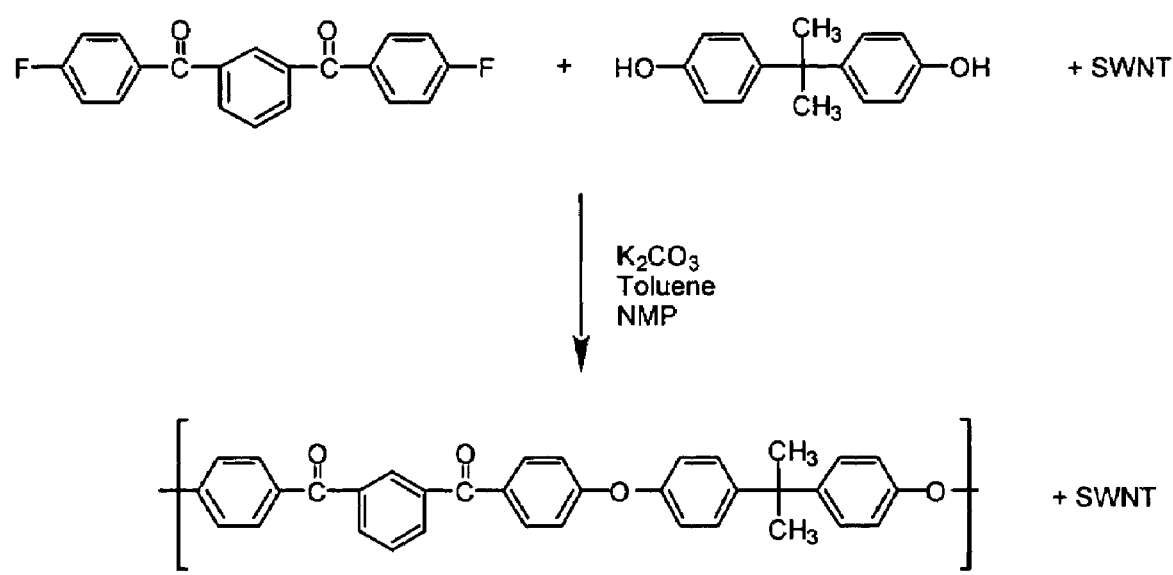
FIG. 11 illustrates preparation of a 0.1% wt/wt LA-NT/poly(arylene ether)/SWNT nanocomposite.

FIG. 11 illustrates the preparation of a 0.1% wt/wt LA-NT/poly(arylene ether)/SWNT nanocomposite by Method (5).

A 100 mL three-necked round bottom flask equipped with a mechanical stirrer, nitrogen inlet and a Dean-Stark trap topped with a condenser was charged with 1,3-bis(4-fluorobenzoyl)benzene (2.0000 g, 6.2052×10$^{-3}$ mol), 4,4'-isopropylieienedphenol (1.4166 g, 6.2052×10$^{-3}$ mol), single-wall carbon nanotube (from Tubes@Rice) suspension 0.0034 g, sonicated at 40 kHz for 18 hours in 5.0 g N-methyl-2-pyrrolidinone (NMP), potassium carbonate (1.03 g), toluene (10 mL) and 8.7 g NMP. The mixture was stirred under nitrogen and water was removed via azeotrope at approximately 135° C. for about 16 hours. The toluene was subsequently removed and the remaining mixture was heated at 170° C. for 6 hours. The viscous mixture was cooled to room temperature and then poured into a 10% aqueous acetic acid solution. A gray fibrous precipitate was collected via filtration and washed with excess water. The solid was dried in a vacuum oven at 150° C. for 4 hours. A solution prepared from NMP (20% solids w/w) was cast onto plate glass and allowed to dry to a tack-free state in a dust-free chamber. The film on the glass plate was placed in a forced air oven for 1 hour each at 100, 150, 175 and 250° C. to remove solvent. The film was subsequently removed from the glass and characterized. A 27 µm thick film exhibited a $T_g$ of 250° C. and exhibited an optical transparency at 500 nm of 63%.

Example 10

Preparation of 0.1wt % CNT/PMMA Nanocomposite from Methyl Methacrylate (MMA) Monomers by Method (6)

Purified SWNTs obtained from Tubes@Rice were used as the conductive inclusions. A dilute SWNT solution, typically approximately 0.01% weight/weight (w/w) in N,N-dimethylformamide (DMF), was prepared. The dilute SWNT solution was homogenized for 10 min and sonicated for one hour in an ultrasonic bath operating at 40 kHz. The sonicated SWNT solution (2 mL, 0.01 g of the solid SWNT) was transferred into a 100 mL three neck round bottom flask equipped with a mechanical stirrer, nitrogen gas inlet, and drying tube outlet filled with calcium sulfate. The flask was immersed in the 80° C. ultrasonic bath throughout the entire synthesis procedure. MMA (10 g, xmol) was added into the flask along with 40 mL of DMF while stirring under sonication at 80° C. After 30 min of stirring the SWNT and MMA mixture, AIBN (0.04188 g) and 1-dodecanethiol (20 ml) were added with stirring under sonication as an initiator and a chain extender, respectively. The dark mixture was stirred in the sonic bath six hours to give a 0.1% by weight SWNT/PMMA solution. During the course of the reaction, a noticeable increase in solution viscosity was observed. The concentration of the SWNT/PMMA was 20% solids (w/w) in DMF. The SWNT/PMMA solution was precipitated in methanol with a high-speed mixer. The precipitates were filtered with an aspirator thoroughly with distilled water. A gray powder was collected and dried in an vacuum oven at 60° C. The dried powder was re-dissolved in DMF and cast onto plate glass and placed in a dry air box for 24 hours to give a tack-free film. This film was thermally treated (to remove solvent) for six hours in a vacuum oven at 60° C. The film was removed from the glass and characterized. The nanocomposite films (SWNT/PMMA) exhibited high relative retention of optical tranmission at 500 nm (>50% at 0.1 wt % SWNT loading) while exhibiting improvements in electrical conductivities of 10–12 orders of magnitude compared to the pristine polymer film.

The above examples are provided for illustrative purposes. In addition to the specific condensation and addition polymers described herein, other addition and condensation polymers may be used, including polyamides, polyesters, polycarbonates, vinyl polymers, polyethylene, polyacrylonitrile, poly(vinyl chloride), polystyrene, poly(vinyl acetate), polytetrafluoroethylene, polyisprene, polyurethane, and poly(m-ethyl metahcrylate)/polystyrene copolymer.

Characterization

Differential scanning calorimetry (DSC) was conducted on a Shimadzu DSC-50 thermal analyzer. The glass transition temperature ($T_g$) was taken as the inflection point of the ΔT versus temperature curve at a heating rate of 10° C./min on thin film samples. UV/VIS spectra were obtained on thin films using a Perkin-Elmer Lambda 900 UV/VIS/NIR spectrophotometer. Thin-film tensile properties were determined according to ASTM D882 using four specimens per test condition. Thermogravimetric analysis (TGA) was performed on a Seiko Model 200/220 instrument on film samples at a heating rate of 2.5° C. min$^{-1}$ in air and/or nitrogen at a flow rate of 15 cm$^3$ min$^{-1}$. Conductivity measurements were performed according to ASTM D257 using a Keithley 8009 Resistivity Test Fixture and a Keithley 6517 Electrometer. Homogenization was carried out using PowerGen Model 35 or a PowerGen Model 700 homogenizer at speeds ranging from 5,000 to 30,000 rpm. Optionally a fluidizer, such as a M-10Y High Pressure Microfluidizer from MFIC Corp. (Newton, Mass.) could be used. Solar absorptivities were measured on a Aztek Model LPSR-300 spectroreflectometer with measurements taken between 250 to 2800 nm with a vapor deposited aluminum on Kapton® as a reflective reference. An Aztek Temp 2000A Infrared reflectometer was used to measure the thermal emissivity. Ultrasonication was carried out using a Ultrasonik 57x ultrasonicator water bath operating at 40 kHz or with a ultrasonic horn (VCX-750, Sonics and Materials, Inc.) equipped with a 13 millimeter probe. Purified, laser ablated singe wall carbon nanotubes (LA-NT) were used as received from Tubes@Rice, Rice University, Houston, Tex. Chemical vapor deposition multi-wall carbon nanotubes (CVD-NT) were used as received from Nanolab, Inc., Watertown, Mass. Optical microscopy was performed on an Olympus BH-2 microscope. Elemental analysis was performed by Desert Analytics, Tucson, Ariz.

The nanocomposite films were characterized for optical, electrical and thermal properties. CNTs were subjected to elemental analysis prior to use. The results are summarized in Table 1. Characterization of the nanocomposite films described in EXAMPLES 1A–1E are presented in Tables 2 and 3. All of these samples were prepared using LA purified SWNTs obtained from Tubes@Rice.

The polymer matrix was prepared from APB and 6FDA. The control film was of comparable thickness or thinner than that of the nanocomposite films. The data in Table 2 indicates that at SWNT weight loadings of 0.1 to 1.0%, the transmission at 500 nm as determined by UV/VIS spectroscopy indicated a relative retention from less

TABLE 1

Elemental analysis of CNTs

| CNT | Carbon, % | Hydrogen, % | Iron, % | Nickel, % | Cobalt, % |
|---|---|---|---|---|---|
| LA-NT Single wall | 78.2 | 0.94 | 0.06 | 1.45 | 1.54 |
| CVD-NT-1 Multi-wall | 96.0 | <0.05 | 1.0 | 0.002 | <0.001 |
| CVD-NT-2 Multi-wall | 97.0 | <0.05 | 1.5 | 0.002 | <0.001 | than 1% up to 80%. The nanocomposite film prepared via Method (1) exhibited by far the lowest retention of optical transmission (less than 1%). The nanocomposite films prepared via Method (6) exhibited significantly higher relative retention of optical tranmission at 500 nm ranging from 38–80% while exhibiting improvements in electrical conductivities of 10–12 orders of magnitude compared to the pristine polymer film. Of particular note is the nanocomposite film designated as EXAMPLE 1A, which contained 0.1 wt % SWNT and exhibited high retention of optical transmission (80%) while exhibiting a volume conductivity of $10^{-8}$ S/cm. When the amount of SWNT was increased five-fold (EXAMPLE 1C), the nanocomposite still exhibited a high retention of optical transmission and an increase in volume conductivity of 11 orders of magnitude compared to the control. The temperature of 5% weight loss as determined by dynamic TGA increased with increasing SWNT concentration (Table 3) suggesting that the incorporation of SWNTs did not have a significant effect on thermal stability as measured by this technique.

TABLE 2

Optical and electrical properties of select nanocomposite films[1].

| Sample Film[2] | SWNT Loading, Weight % | UV/VIS (500 nm) Transmission % | Optical Transmission Retention, % | Conductivity $\sigma_v^3$, S/cm |
|---|---|---|---|---|
| APB/6FDA | 0 | 85 | — | $6.3 \times 10^{-18}$ |
| EXAMPLE 1A | 0.1 | 68 | 80 | $1 \times 10^{-8}$ |

TABLE 2-continued

Optical and electrical properties of select nanocomposite films[1].

| Sample Film[2] | SWNT Loading, Weight % | UV/VIS (500 nm) Transmission % | Optical Transmission Retention, % | Conductivity $\sigma_v^3$, S/cm |
|---|---|---|---|---|
| EXAMPLE 1B | 0.2 | 62 | 66 | $1 \times 10^{-7}$ |
| EXAMPLE 1C | 0.5 | 54 | 64 | $2 \times 10^{-7}$ |
| EXAMPLE 1D | 1.0 | 32 | 38 | $>10^{-5}$ |
| EXAMPLE 1E | 1.0 | <1 | <1 | $>10^{-5}$ |

[1]Films were prepared by Method (6) except for EXAMPLE 1E, which was prepared by Method (1). All films were prepared using LA purified SWNTs (LA-NT) from Tubes @ Rice.
[2]UV/VIS transmission was normalized at 34 μm.
[3]$\sigma_v$ (S/cm) = volume conductivity, S: siemens = ohm$^{-1}$ Thermal emissivity ($\epsilon$) and solar absorptivity ($\alpha$) measurements are also shown in Table 3. In general, the addition of CNTs to the polyimide material increased both $\epsilon$ and $\alpha$. Dynamic mechanical data shown in Table 4 show that modulus increased with increasing nanotube concentration, with up to a 60% improvement at 1.0 vol % SWNT loading level. The tan δ peak decreased and shifted up 10° C. with SWNT incorporation at 1.0 vol % as seen in Table 4, which suggests that CNT reinforcement made the nanocomposite more elastic and thermally more stable by increasing the glass transition temperature.

TABLE 3

Temperature of 5% weight loss of nanocomposite films by TGA[1]

| Sample Film | SWNT Loading, Weight % | Temp. of 5% Weight Loss, ° C. | Solar absorptivity ($\alpha$) | Thermal emissivity ($\epsilon$) |
|---|---|---|---|---|
| APB/6FDA | 0 | 444 | 0.068 | 0.525 |
| EXAMPLE 1A | 0.1 | 461 | 0.268 | 0.578 |
| EXAMPLE 1B | 0.2 | 474 | 0.398 | 0.614 |
| EXAMPLE 1C | 0.5 | 481 | 0.362 | 0.620 |
| EXAMPLE 1D | 1.0 | 479 | 0.478 | 0.652 |

[1]By dynamic TGA at a heating rate of 2.5° C./min. in air after holding 30 min. at 100° C.

TABLE 4

Dynamic Mechanical Data

| Sample Film | Tan δ Max, ° C. | Storage modulus (GPa) |
|---|---|---|
| APB/6FDA | 214 | $8.5 \times 10^8$ |
| EXAMPLE 1A | 213 | $9.2 \times 10^8$ |
| EXAMPLE 1C | 214 | $1.2 \times 10^9$ |
| EXAMPLE 1D | 224 | $1.4 \times 10^9$ |

Another series of 0.1 and 0.2 wt % nanocomposite films were prepared from the polyimide derived from APB-PPO and ODPA and three different types of CNTs. Method (5) was used for the preparation of the nanocomposite films described in EXAMPLES 3–9. The nanotubes differed in their method of preparation (either LA or CVD) as well as the average lengths and diameters of the tubes. In addition, LA-NT are single wall carbon nanotubes (SWNTs) and CVD-NT-1 and CVD-NT-2 are multi-wall carbon nanotubes (MWNTs). Table 5 lists the types, sources and approximate dimensions of the nanotubes used in the preparation of nanocomposite films described in EXAMPLES 3–8.

TABLE 5

Nanotube Designations, Source and Approximate Dimensions

| Nanotube ID (Type) | Production Method | Average Diameter, nm | Nanotube Source | Average Length, μm |
|---|---|---|---|---|
| LA-NT (SWNT) | Laser ablation | 1.2–1.6 | Tubes @ Rice | ~3 |
| CVD-NT-1 (MWNT) | CVD | <20 | Nanolab, Inc. | <1 |
| CVD-NT-2 (MWNT) | CVD | 10–20 | Nanolab, Inc. | <20 |

Table 6 lists physical properties of the nanocomposite films, such as $T_g$ and thin film mechanical properties. The $T_g$ ranged from 187 to 212° C. The films exhibited room temperature tensile strengths and moduli from 77 to 99 MPa and 2.8 to 3.3 GPa, respectively. The elongations at break ranged from 3.1 to 4.9%. These values are comparable to other aromatic polyimides. The polyimide/CNT nanocomposite films exhibited reductions in $T_g$ of 5–25° C., comparable tensile strengths (except for EXAMPLE 6), increased tensile moduli and comparable or slightly lower elongations to break.

TABLE 6

Thin Film Tensile Properties at Room Temperature

| Sample Film, (CNT conc., wt %) | | $T_g$, ° C. | Tensile Strength, MPa | Tensile Mod., GPa | Elong. @ Break, % |
|---|---|---|---|---|---|
| APB-PPO/ODPA | (0.0) | 212 | 97 | 2.8 | 4.7 |
| EXAMPLE 3 | (0.1) | 187 | 88 | 3.2 | 3.5 |
| EXAMPLE 5 | (0.1) | 205 | 99 | 3.3 | 4.2 |
| EXAMPLE 7 | (0.1) | 206 | 90 | 3.1 | 4.0 |
| EXAMPLE 4 | (0.2) | 200 | 94 | 3.2 | 4.9 |
| EXAMPLE 6 | (0.2) | 207 | 77 | 3.0 | 3.1 |
| EXAMPLE 8 | (0.2) | 199 | — | — | — |

Imidized thin film samples were measured for optical transparency using UV/VIS spectroscopy. The results are presented in Table 7. The retention of optical transparency at 500 nm ranged from 52 to 89%. It is well known that for these polyimide films, the optical transmission is dependent upon film thickness such that increasing film thickness results in a decrease in optical transmission. As shown in Table 7, the films thicknesses of the nanocomposite films were comparable or slightly greater than that of the control. Thus it is reasonable to compare the results directly without normalization. "High", "moderate", and "poor" retention of optical transparency are defined herein to mean greater than 50%, 35% to 50%, and less than 35%, respectively.

Thermal emissivity ($\epsilon$) and solar absorptivity ($\alpha$) measurements are shown in Table 8. In general, the addition of CNTs to the polyimide material increased both $\alpha$ and $\alpha$. The solar absorptivity increased depending upon CNT type, for example the samples with the laser ablated nanotubes (SWNTs, EXAMPLES 3 and 4) exhibited the lowest increase while the chemical vapor deposited nanotubes (MWNTs, EXAMPLES 5 and 6) exhibited the largest increase.

TABLE 7

Optical Transparency of Polyimide/CNT Nanocomposite Films

| Sample film | CNT Loading, Weight % | Transparency @ 500 nm, % | Relative Retention of Optical Transparency, % | Film Thickness, μm |
|---|---|---|---|---|
| APB-PPO/ODPA | 0 | 85 | — | 25 |
| EXAMPLE 3 | 0.1 | 76 | 89 | 32 |
| EXAMPLE 5 | 0.1 | 66 | 78 | 32 |
| EXAMPLE 7 | 0.1 | 48 | 56 | 27 |
| EXAMPLE 4 | 0.2 | 75 | 88 | 25 |
| EXAMPLE 6 | 0.2 | 44 | 52 | 32 |

As mentioned above for optical transmission, $\alpha$ and $\epsilon$ are also dependent upon film thickness. As shown in Table 8, the nanocomposite film thicknesses were comparable or slightly greater than that of the control. Thus it is reasonable to compare the results directly without normalization. For some space applications, the increase in solar absorptivity exhibited by EXAMPLES 3 and 4 would not be detrimental. All samples exhibited increases in thermal emissivity which for many space applications is desirable. The term "optically transparent" is defined herein to mean the relative retention of greater than 50% of optical transparency (relative to a control film of comparable thickness) as measured by UV/VIS spectroscopy at a wavelength of 500 nm. The term "electrically conductive" is defined herein to mean exhibiting a surface conductivity ranging from less than $10^{-5}$ S/cm to $10^{-12}$ S/cm.

TABLE 8

Solar Absorptivity and Thermal Emissivity of Polyimide/CNT Nanocomposite Films

| Sample film, (CNT conc., wt %) | | Thermal Emissivity ($\epsilon$) | Solar Absorptivity ($\alpha$) | Film Thickness, μm |
|---|---|---|---|---|
| APB-PPO/ODPA | (0.0) | 0.560 | 0.049 | 25 |
| EXAMPLE 3 | (0.1) | 0.579 | 0.142 | 32 |
| EXAMPLE 5 | (0.1) | 0.641 | 0.253 | 32 |
| EXAMPLE 7 | (0.1) | 0.703 | 0.362 | 27 |
| EXAMPLE 4 | (0.2) | 0.609 | 0.151 | 25 |
| EXAMPLE 6 | (0.2) | 0.614 | 0.443 | 32 |

What is claimed is:

1. A method for dispersing carbon nanotubes in a polymer matrix to prepare a polymer/carbon nanotube nanocomposite, comprising:
   (a) dispersing carbon nanotubes in an organic solvent;
   (b) adding one or more monomers of the polymer of interest to the dispersed nanotubes; and
   (c) polymerizing the monomers in the presence of the dispersed nanotubes under mechanical stirring;
wherein the polymer is selected from the group consisting of poly(arylene ether) and copoly(arylene ether); and further wherein the monomers comprise at least one activated halide and at least one bisphenol.

2. The method of claim 1, wherein an activated halide is 1,3-bis(4-fluorobenzoyl)benzene and a bisphenol is 4,4'-isopropylieienediphenol.

3. A method for dispersing carbon nanotubes in a polymer matrix to prepare a polymer/carbon nanotube nanocomposite, comprising:

(a) dispersing carbon nanotubes in an organic solvent;
(b) adding one or more monomers of the polymer of interest to the dispersed nanotubes; and
(c) polymerizing the monomers in the presence of the dispersed nanotubes under mechanical stirring;

wherein the polymer is selected from the group consisting of polyimide, copolyimide, poly(amide acid), and copoly(amide acid); the monomers comprise at least one diamine and at least one dianhydride; and a diamine is 1,3-bis(3-aminophenoxy) benzene and a dianhydride is 4,4'-perfluoroisopropylidiene dianhydride.

4. A method for dispersing carbon nanotubes in a polymer matrix to prepare a polymer/carbon nanotube nanocomposite, comprising:
(a) dispersing carbon nanotubes in an organic solvent;
(b) adding one or more monomers of the polymer of interest to the dispersed nanotubes; and
(c) polymerizing the monomers in the presence of the dispersed nanotubes under mechanical stirring;

wherein the polymer is selected from the group consisting of polyimide, copolyimide, poly(amide acid), and copoly(amide acid); the monomers comprise at least one diamine and at least one dianhydride; and a diamine is 2,6-bis(3-aminophenoxy) benzonitrile and a dianhydride is 3,3',4,4'-oxydiphthalic dianhydride.

5. A method for dispersing carbon nanotubes in a polymer matrix to prepare a polymer/carbon nanotube nanocomposite, comprising:
(a) dispersing carbon nanotubes in an organic solvent;
(b) adding one or more monomers of the polymer of interest to the dispersed nanotubes; and
(c) polymerizing the monomers in the presence of the dispersed nanotubes under mechanical stirring;

wherein the polymer is selected from the group consisting of polyimide, copolyimide, poly(amide acid), and copoly(amide acid); the monomers comprise at least one diamine and at least one dianhydride; and a diamine is [2,4-bis(3-aminophenoxy)phenyl]diphenylphosphine oxide and a dianhydride is 3,3',4,4'-oxydiphthalic dianhydride.

* * * * *